United States Patent [19]

Nijweide

[11] 3,890,454

[45] June 17, 1975

[54] METHOD OF CONDITIONING MEAL

[75] Inventor: Robert Jan Nijweide, Rosmalen, Netherlands

[73] Assignee: Verenigde Mengvoederfabrieken, Tramkade, 24, Netherlands

[22] Filed: Jan. 8, 1974

[21] Appl. No.: 431,707

[30] Foreign Application Priority Data
Jan. 17, 1973  Netherlands.................... 7300679

[52] U.S. Cl. ............................. 426/508; 426/512
[51] Int. Cl. .................................................. A23b 9/00
[58] Field of Search .................. 426/506, 507–508, 426/510–512, 454–456

[56]     References Cited
         UNITED STATES PATENTS 3,574,632   4/1971   Lanz ................................. 426/454
3,615,651   10/1971  Parks ................................ 426/511
3,615,674   10/1971  Johnson et al. ................... 426/454
3,778,521   12/1973  Fisher .............................. 426/508

*Primary Examiner*—Samih H. Zaharna
*Assistant Examiner*—Ernest G. Therkorn
*Attorney, Agent, or Firm*—Anthony A. O'Brien

[57]                ABSTRACT

A method of conditioning meal to bring it into condition for processing in apparatus such as an extruder or pelletizer, and which comprises providing a stream of meal and mixing it with steam and water, characterized by dividing said stream of meal into partial streams, adding steam and water to one of said streams in quantities causing starch gelatinization in the meal of said partial stream, and subsequently recombining and mixing said partial streams.

3 Claims, No Drawings

METHOD OF CONDITIONING MEAL

This invention relates to a method of conditioning meal to bring it into condition for processing in apparatus such as an extruder or pelletizer.

The invention has in particular, but not exclusively, utility in the production of animal food pellets.

It is conventional for the meal to be mixed with water and steam in a stream of meal and to be rendered coherent by a binder. Subsequently the meal will be extruded through die holes or passages of a pelletizer by means of rollers. Depending on the shape and length of the die holes or passages, counter-pressure is generated in them through friction, as a consequence of which the meal is compacted under high pressure and formed into ribbons of the general shape desired, which are then cut up into pieces generally referred to as pellets.

Generally speaking, however, the pressure is insufficient to produce pellets having sufficient strength and wear resistance, so that during further processing, handling, transport and storage, a substantial proportion of the pellets is broken, crumbles apart, and produces dust. These finer particles are generally wasted, since they are not eaten by the animals to which the pellets are being fed.

Extruding the pellets under a higher pressure could remedy this problem, but is inacceptable as it reduces the rate of production and subjects the apparatus to excessive wear. It has therefore become the practice to add binders for cementing the meal particles together.

However, binders also have a number of inherent disadvantages. Thus excess of molasses causes diarrhoea in pigs and poultry. Other binders, such as lignosulphates and clays such as bentonite, are unsuitable for use in modern plants on account of their being highly hygroscopic, owing to which they cannot be transported in bulk and stored in silos.

Indeed, these additives are not the best solution for producing hard pellets.

A better method would be to increase the binding capacity of the raw materials proper by causing gelatinization of the starch contained therein.

In the case of food for cats and dogs, complete gelatinization is at present being applied. However, that process is too expensive for other kinds of animal food. Furthermore the process results in too high a moisture content and undue tackiness of the material for it to be processed in a normal extruder. The proper moisture content of the meal for processing in an extruder is about 15 to 17 percent. When the moisture content is lower the meal is burnt in the die holes or passages; when it is higher the meal does not flow properly through the die passages.

The degree of gelatinization depends on various factors, such as fineness and composition of the meal, the origin of the starch contained therein, the temperature, the moisture content, and the period for which a given temperature and moisture content are maintained. The minimum moisture content of the mix, required for gelatinization, is 18 to 20 percent, which in connection with the above difficulties in processing is not acceptable.

Furthermore the temperature at which initial gelatinization sets in is about 65°C, depending on the kind of starch involved.

All of the above factors involve that little, if any, gelatinization occurs in conventional conditioning processes.

It is an object of the present invention to provide a method whereby a sufficient degree of gelatinization can be induced without causing difficulties.

According to the invention, there is provided a method of conditioning meal to bring it into condition for processing in apparatus such as an extruder or pelletizer, and which comprises providing a stream of meal and mixing it with steam and water, characterized by dividing said stream of meal into partial streams, adding steam and water to one of said streams in quantities causing starch gelatinization in the meal of said partial stream, and subsequently re-combining and mixing said partial streams.

Preferably the total amount of water and steam that would normally be added to the total stream of meal is added to one of said partial streams.

Owing to the division of the stream of meal, it is possible to add an amount of water and steam to one of the partial streams in an amount required to effect the desired degree of gelatinization, while yet the desired moisture content can be given to the ultimate mix before entry into the extruder by re-combining the partial streams.

The invention is illustrated by the following numerical, comparative examples.

EXAMPLE 1

Processing of a stream of meal by conventional process.

A stream of meal of 10 tons/hour was heated with steam from 20° to 43°C. The original moisture content of the meal was 13 percent; water had been added to increase this percentage to 15 percent; and the steam treatment raised the moisture content further to 16.5 percent. No gelatinization occurred.

EXAMPLE 2

Processing of a stream of meal by the method of the present invention.

The same kind of meal, supplied in a stream of 10 tons per hour, was divided into a stream of 7 tons/hour and one of 3 tons/hour. The meal initially had a moisture content of 13 percent.

The stream of 3 tons/hour was introduced into a mixer, and water was added to raise the moisture content of the meal to 19.7 percent, and steam was introduced to raise the temperature of the meal from 20° to 100°C. Owing to the introduction of steam the moisture content was raised by a further 5.3 percent to 25 percent. In conjunction with the selected duration of 6 minutes, this resulted in the desired degree of gelatinization.

Owing to the fact that the partial stream is only 3 tons/hour, the conditioning mixer only needs to be of 500 lb. capacity to allow the meal a residence time of 6 minutes during which it is maintained at a moisture content of 25 percent and a temperature of 100°C.

The partial stream treated for gelatinization was then mixed with the stream of 7 tons/hour, the latter being maintained in untreated condition, and the final product of the conditioning treatment had a moisture content of 16.5 percent and a temperature of 43°C, corresponding to the moisture and temperature condition of the stream of meal treated in accordance with Example 1. The moisture content and tackiness of the mixed stream is favorable for processing in an extruder.

The extruded product form the meal treated by the method of the present invention was found to be far superior to that produced from the meal treated by the conventional method. This was due to the presence of gelatinized starch which has not yet become dehydrated and has fully retained its cohesive power to cement the meal in the pellets together.

In addition to producing a superior pellet, the method according to the invention is productive of a food product that is better digestible for animals.

I claim:

1. In a method of making food products by extruding moist meal through the die holes of a pellet press, the steps of
    a. providing a first stream of meal;
    b. dividing said first stream of meal into a second stream and a third stream;
    c. adding steam and water to said second stream of meal in a proportion sufficient to elevate the temperature thereof and to raise the moisture content thereof sufficiently for causing gelatinization of at least a substantial part of the starch contained in said second stream;
    d. maintaining said second stream of meal at the elevated temperature for a time sufficient to cause at least partial gelatinization of said starch;
    e. maintaining said third stream substantially ungelatinized and with substantially less moisture content than said second stream; subsequently
    f. mixing said second stream with said third stream to produce a fourth stream of meal; and
    g. feeding said fourth stream to said die holes;
    the third stream having a size and moisture content relative to the size and moisture content of the second stream to produce a moisture content and tackiness in the fourth stream favorable for extruding through the die holes to produce pellets wherein the meal is cemented together by the gelatinized starch, the moisture content of the third stream being less than that necessary to result in substantial gelatinization of the meal by heating.

2. A method as claimed in claim 1 wherein the total amount of water and steam added to the streams is added to said second stream.

3. A method according to claim 1 wherein the amount of steam and water added to said second stream is sufficient to elevate the moisture content of said second stream above 18 percent, and the moisture content of said fourth stream is in the range of about 15 to 17 percent.

* * * * *